(12) United States Patent
Hoke et al.

(10) Patent No.: US 6,240,731 B1
(45) Date of Patent: Jun. 5, 2001

(54) LOW NOX COMBUSTOR FOR GAS TURBINE ENGINE

(75) Inventors: James B. Hoke, Tolland, CT (US); Irving Segalman, Boyton Beach; Kenneth S. Siskind, West Palm Beach, both of FL (US); Reid D. C. Smith, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/001,889

(22) Filed: Dec. 31, 1997

(51) Int. Cl.[7] ............................ F23R 3/14; F23R 3/50
(52) U.S. Cl. ............................ 60/732; 60/748; 60/752; 239/400
(58) Field of Search ............................ 60/748, 732, 752; 239/400, 403, 405

(56) References Cited

U.S. PATENT DOCUMENTS

| | | | |
|---|---|---|---|
| 3,859,786 | * 1/1975 | Azelborn et al. | 60/748 |
| 3,946,552 | * 3/1976 | Weinstein et al. | 239/400 |
| 4,173,118 | * 11/1979 | Kawaguchi | 60/748 |
| 4,446,692 | * 5/1984 | Adkins | 60/39.23 |
| 4,698,963 | * 10/1987 | Taylor | 60/732 |
| 4,773,596 | * 9/1988 | Wright et al. | 60/732 |
| 4,787,208 | * 11/1988 | DeCorso | 60/732 |
| 4,819,438 | * 4/1989 | Schultz | 60/732 |
| 4,845,940 | 7/1989 | Beer | 60/732 |
| 4,912,931 | 4/1990 | Joshi et al. | 60/732 |
| 5,052,919 | * 10/1991 | Becker | 60/732 |
| 5,239,818 | * 8/1993 | Stickles et al. | 60/737 |
| 5,285,628 | * 2/1994 | Korenberg | 60/732 |
| 5,417,070 | 5/1995 | Richardson | 60/748 |
| 5,481,867 | 1/1996 | Dubell et al. | 60/39.36 |
| 5,765,376 | * 6/1998 | Zarzalis et al. | 60/748 |

FOREIGN PATENT DOCUMENTS

| | | |
|---|---|---|
| 0 073 265 | 3/1983 | (EP) . |
| 0 286 569 | 10/1988 | (EP) . |
| 0 732 546 | 9/1996 | (EP) . |

OTHER PUBLICATIONS

Carlstrom, L.A. et al., "Improved Emissions in Today's Combustion System", International Seminar, pp. 1–18, Jun. 1978.*

* cited by examiner

Primary Examiner—Ted Kim
(74) Attorney, Agent, or Firm—Ronald G. Cummings

(57) ABSTRACT

A method of combusting fuel in the combustor of a gas turbine engine is disclosed which includes injecting fuel and a first predetermined amount of airflow into the combustion chamber to form a fuel-rich, highly mixed, uniform distribution fuel-air spray pattern flowing downstream in the combustion chamber and introducing a second predetermined amount of airflow into the fuel air spray pattern from combustor air inlets positioned at a first predetermined distance downstream from the combustor dome with the first predetermined distance being greater than 0.75 times the dome height and said second predetermined amount of airflow being sufficient to cause rapid mixing and quenching of the rich fuel-air mixture to a lean fuel-air mixture. A combustor for a gas turbine engine is also disclosed which includes sidewalls and a dome wall to form a combustion chamber, a fuel injector/air swirler assembly for injecting a fuel air spray, a first and second array of air inlets for introducing airflow into the combustion chamber sufficient to cause rapid combustion and rapidly resulting lean-fuel air mixture, the first array being positioned a predetermined distance downstream from the dome wall with the predetermined distance being greater than 0.75 times the dome height and the second array of air inlets being positioned downstream from the first array.

6 Claims, 5 Drawing Sheets

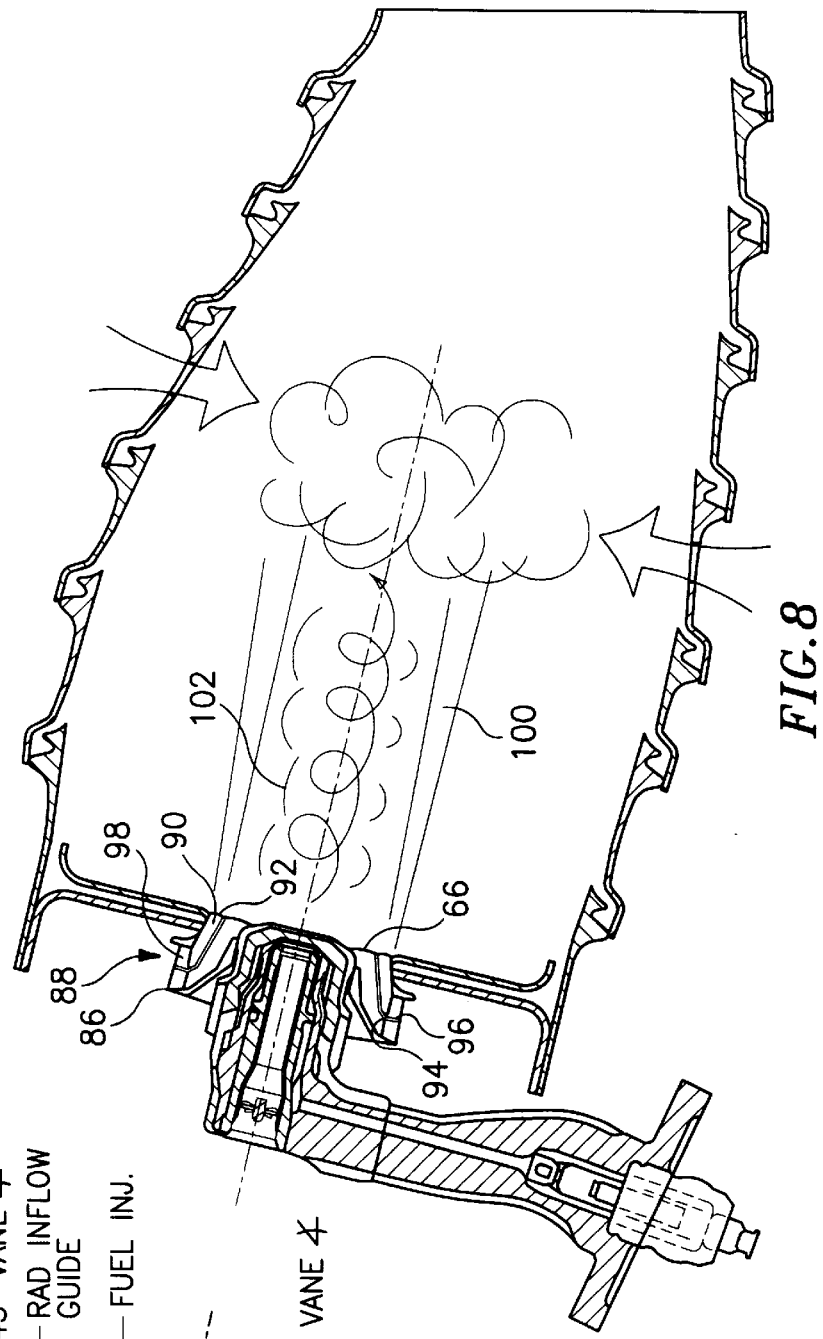
*FIG.8*
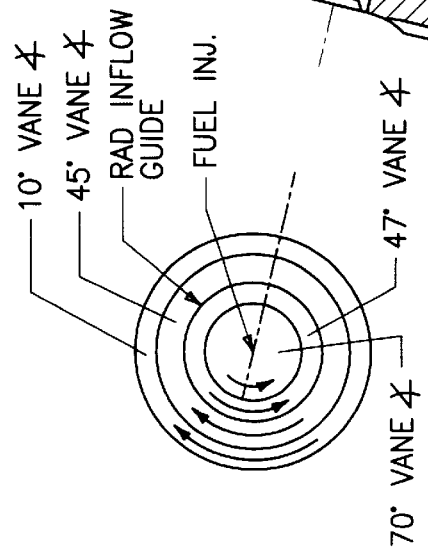
*FIG.9* SWIRL ORIENTATION

LOW NOX COMBUSTOR FOR GAS TURBINE ENGINE

TECHNICAL FIELD

This invention relates generally to gas turbine engine combustors and more particularly to a low Nox combustor and method of operation.

BACKGROUND OF THE INVENTION

Gas turbine engines emit various pollutants including oxides of nitrogen ("NOx"). NOx is primarily formed through the thermal fixation of nitrogen and results from the high temperature combustion of fuel and air in the gas turbine engine. Environmental concerns and more stringent governmental regulation of NOx emissions have prompted designers to investigate various methods for reducing the generation of NOx by gas turbine engines. Examples of devices for reducing or controlling NOx are disclosed in the following commonly assigned patents: (1) Snyder et al., U.S. Pat. No. 5,256,352 issued Oct. 26, 1993 entitled Air-Liquid Mixer; (2) McVey et al., U.S. Pat. No. 5,263,325 issued Nov. 23, 1993 entitled Low Nox Combustion; and (3) Marshall, U.S. Pat. No. 5,406,799 issued Apr. 18, 1995 entitled Combustion Chamber.

Two basic approaches for a low NOx fuel injection system are (1) a locally lean stoichiometry system and (2) a locally rich stoichiometry system. It is desirable in a fuel rich approach to operate in the fuel spray equivalence ratio above 1.6 prior to rapidly quenching down to appropriate lean burning levels. The rich based system also requires a rapid mixing process controlled at some distance downstream of the fuel injection apparatus so that excessive Nox is not produced during the quenching process. However, the rich approach is susceptible to a potential increase in smoke. It is therefor desirable to provide a fuel-rich combustor system and method of operation which reduces Nox without a detrimental increase in smoke.

SUMMARY OF THE INVENTION

It is an object of the present invention to provide a new and improved combustor and method of operation which reduces NOx emission in a gas turbine engine.

Another object of the invention is to provide such a combustor which affords a rapid mixing process controlled at some distance downstream of the fuel injection mechanism.

Another object of the invention is to provide such a combustor which minimizes residence time at high temperature.

A still further object of the invention is to provide such a combustor which can achieve a coherent central flow structure downstream from the nozzle.

A still further object of the invention is to provide such a combustor which affords enhanced mixing so as to eliminate or substantially reduce fuel-rich regions to thereby control smoke.

Other objects will be in part obvious and in part pointed out more in detail hereinafter.

Accordingly, it has been found that the foregoing and related objects are attained and the disadvantages of the prior art are overcome in a combustor having first and second sidewalls connected to a dome to form an elongated combustion chamber with an upstream end and a downstream end. The dome wall is disposed at the upstream end of the chamber and has a predetermined dome height. A fuel injector/swirler apparatus is mounted in the dome and is configured to produce a fuel-rich, highly mixed fuel-air spray pattern with uniform distribution. The sidewalls contain an array of air inlets configured for introducing airflow into the combustion chamber sufficient to cause rapid mixing and quenching of the rich fuel-air mixture to a lean fuel-air mixture. The inlets are disposed to direct air into the fuel-air spray pattern and the inlets nearest the dome are positioned a first predetermined distance downstream from the dome. The predetermined distance is greater than 0.75 times the dome height.

In the method of the present invention for combusting fuel in the combustor of a gas turbine engine of the type having a combustor dome of predetermined height, a fuel injector/air swirler apparatus mounted in the dome and combustor side walls forming a combustion chamber, the method includes the steps of injecting fuel and a first predetermined amount of airflow into the combustion chamber to form a fuel-rich, highly-mixed, uniform distribution fuel-air spray pattern flowing downstream in the combustion chamber. A second predetermined amount of airflow is introduced into the fuel-air spray pattern from combustor air inlets positioned at a first predetermined distance downstream from frome the dome. The first predetermined distance is greater than 0.75 times the dome height and the second predetermined amount of airflow is that amount of dilution air sufficient to cause rapid mixing and quenching of the fuel-air mixture to a lean fuel-air mixture. In one embodiment of the invention, the fuel-air spray pattern is maintained for the first predetermined distance without the introduction into the fuel-spray pattern of additional airflow for mixing, conditioning or combustion.

BRIEF DESCRIPTION OF THE DRAWINGS

FIG. 8 is a partly diagramatic sectional side view of an alternate embodiment of a combustor of the present invention.

FIG. 9 is a diagram of the angular swirl orientation of the swirlers of the nozzle/guide assembly of FIG. 8.

DESCRIPTION OF THE PREFERRED EMBODIMENT

Figure 1:
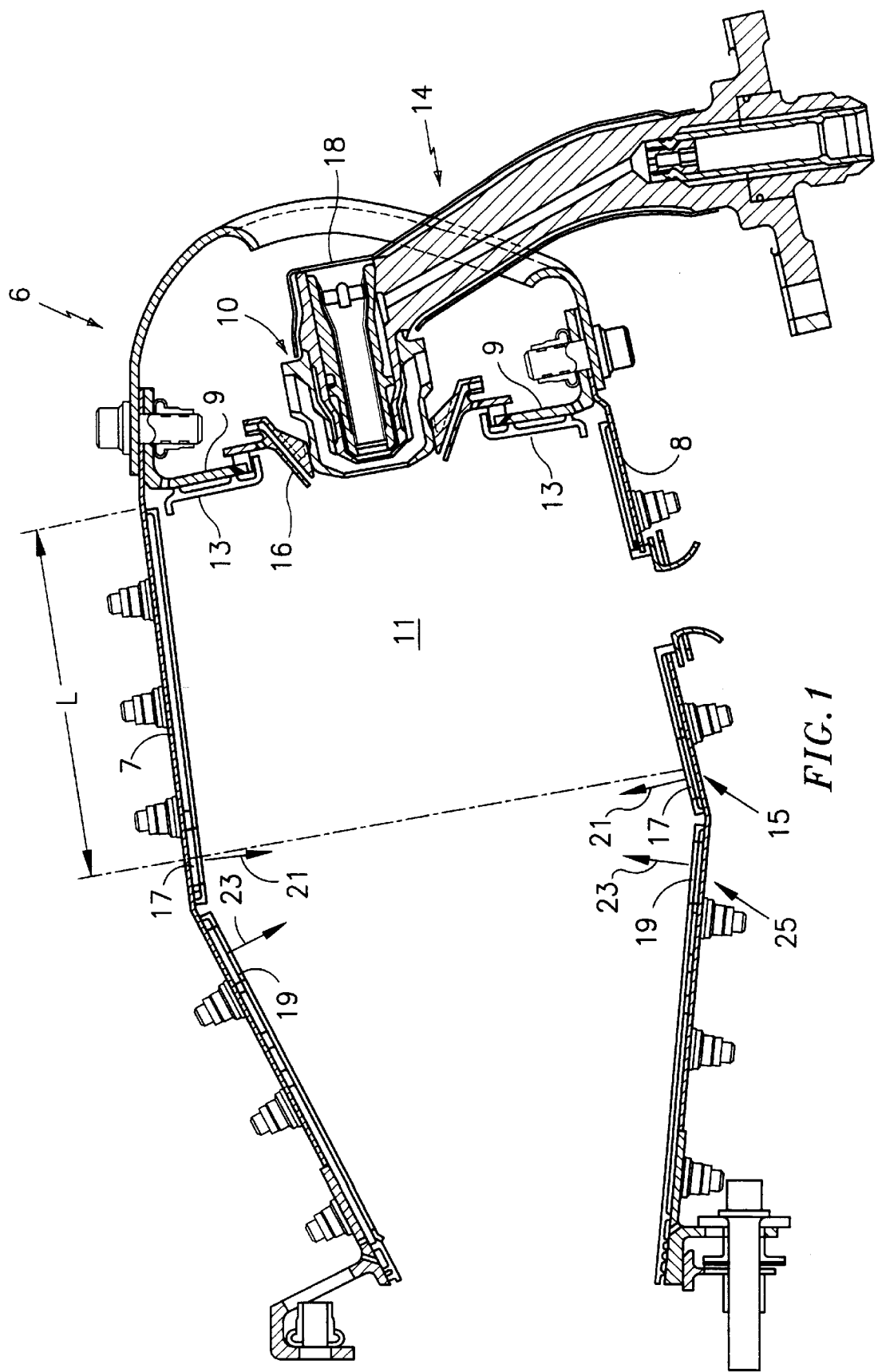
FIG. 1 is a sectional side view of the combustor of the present invention.

Although specific forms of the present invention have been selected for illustration in the drawings, and the following description is drawn in specific terms for the purpose of describing these forms of the invention, the description is not intended to limit the scope of the invention which is defined in the appended claims.

Referring to FIG. 1, the combustor of the present invention is shown and generally designated by the numeral 6. The combustor 6 generally comprises sidewalls 7,8 connected to a dome or end wall 9 to form an elongated annular combustion chamber 11. A fuel injector/air swirler assembly in the form of a fuel nozzle/guide assembly generally designated by the numeral 10 is mounted in the dome 9 at the upstream end of the combustion chamber 11. The dome 9 includes heat shields 13 mounted on the interior face of dome 9 adjoining the nozzle guide assembly 10.

The sidewalls 7,8 contain a first array 15 of air inlets or passages 17 for introducing airflow into the combustion chamber as indicated by the flow arrow 21. The air inlets 17 are circumferentially disposed about the combustion chamber and positioned a predetermined distance "L" downstream from the the heat shields 13 of dome 9. The dome 9 has a height dimension "H" (not shown) measured between the sidewalls 7,8 and, as will be described in more detail hereafter, the distance L of the air inlets is defined in terms of the dome height H. The sidewalls 7,8 also contain a second array 25 of circumferentially disposed air inlets 19 located downstream from inlets 17 for similarly introducing airflow into the combustion chamber as indicated by the flow arrows 23. Additional arrays of inlets may be utilized dependent upon the application.

The nozzle/guide assembly 10 is configured to provide a downstream flowing, fuel-rich, highly mixed, uniform distribution fuel-air pattern in the combustion chamber 11. While various fuel injector/air swirler apparatus may provide a similar fuel-air pattern suitable for the present invention, the nozzle/guide assembly 10 is particularly advantageous and is described in detail, inter alia, for purposes of disclosing the best mode for practicing the invention, it being understood however that the scope of the present invention is not intended to be limited by the detailed features of nozzle/guide assembly 10.

Figure 2:
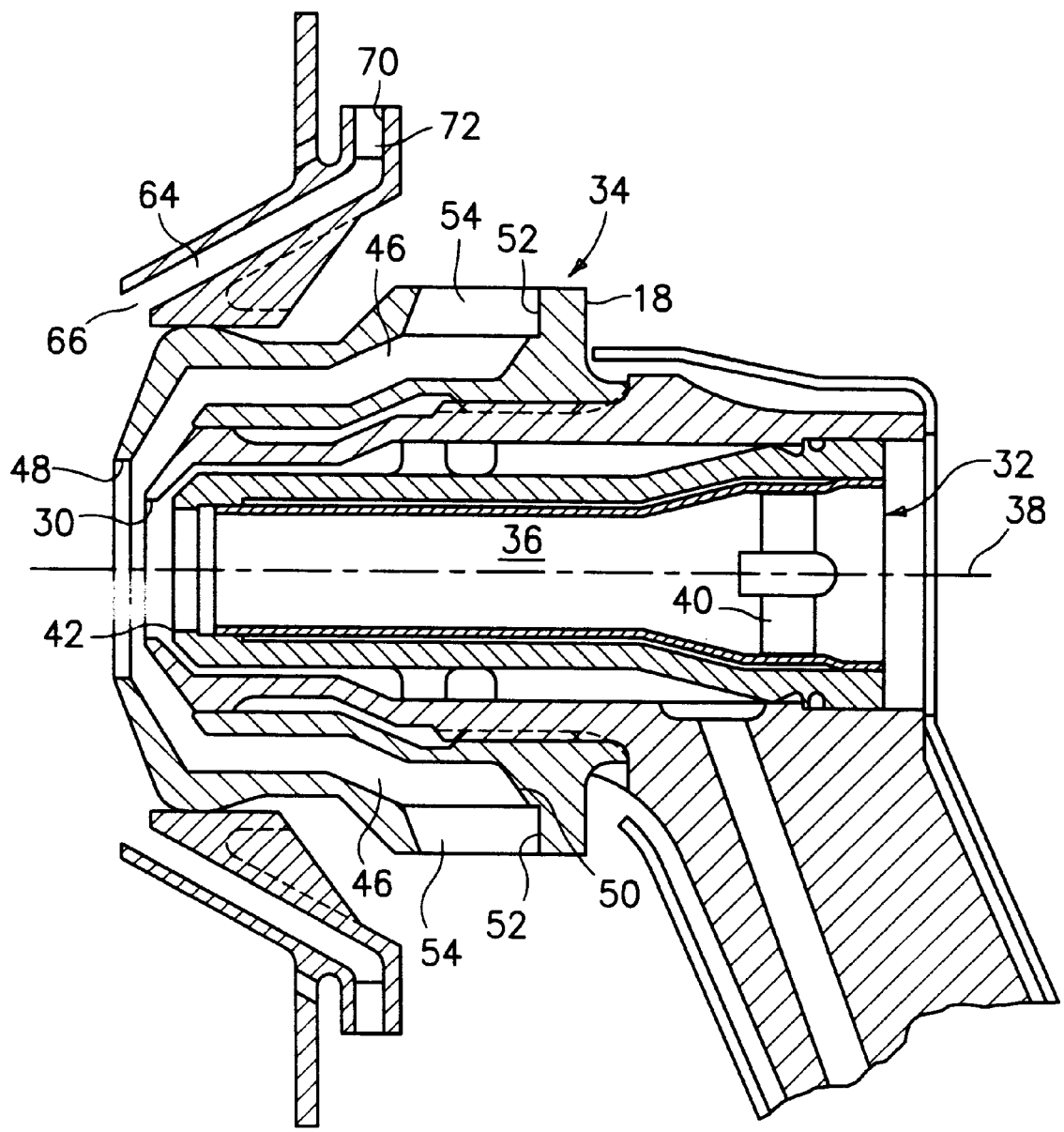
FIG. 2 is an enlarged sectional view, partly broken away, of nozzle/guide assembly in accordance with the present invention.
Figure 5:
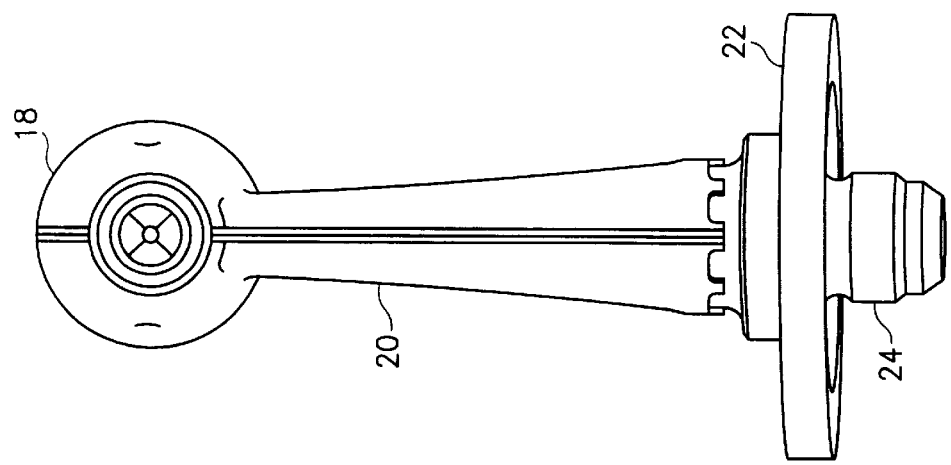
FIG. 5 is a rear view of the nozzle of FIG. 3.
Figure 4:
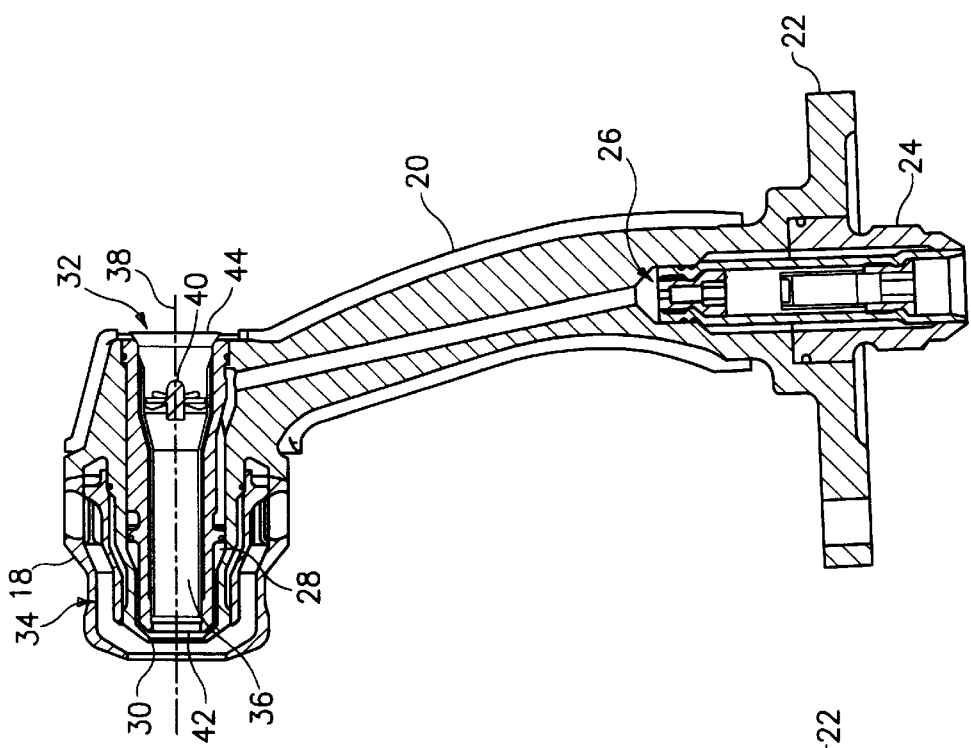
FIG. 4 is a sectional side view of the nozzle of FIG. 3.
Figure 3:
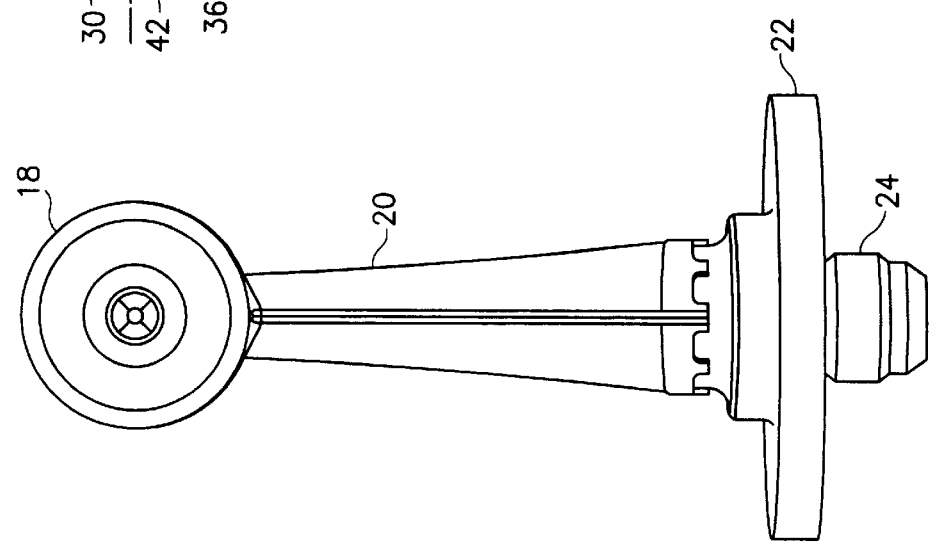
FIG. 3 is an elevation view of the nozzle of FIG. 2.

The nozzle/guide assembly 10 generally comprises a nozzle 14 (FIG. 3) and nozzle guide 16 (Fig.6) as shown assembled in FIG. 2. Referring to FIGS. 3–5, the nozzle 14 has a head 18 connected to the base 22 by stem 20. The base 22 has a fitting 24 for connection to a fuel source (not shown). A fuel delivery system 26 has a fuel delivery passage 28 terminating in an annular discharge outlet 30 for delivering fuel from the fitting 24 to the discharge outlet 30. The fuel delivery system 26 is the type that delivers a thin film or sheet of fuel at the discharge outlet 30 such as the system described in commonly assigned U.S. Pat. No. 4,946,105 to Pane, Jr. et al. issued Aug. 7, 1990 entitled Fuel Nozzle For Gas Turbine Engine (which disclosure is incorporated by reference herein) and such system need not be described further for the purposes of the present invention.

The nozzle head 18 includes an axial inflow swirler 32 and a radial inflow swirler 34. The swirler 32 comprises an air passage 36 concentric to the centerline 38 of the head 18 with an inlet end 44 to receive axially inflowing air, a vane assembly 40 to impart swirl to the air and an outlet end 42 adjoining the fuel discharge outlet 30.

As best seen in FIG. 2, the radial inflow swirler 34 has an annular air passage 46 concentric to centerline 38 with an outlet end 48 adjoining fuel discharge outlet 30 and an inner end 50. The inner end 50 has a plurality of equi-spaced, circumferentially disposed air inlet ports 52. The ports 52 open radially outwardly for the radial inflow of air into the passage 46. Each port 52 has an adjoining swirl vane 54 disposed at a predetermined swirl angle to impart swirl to the inflowing air. The angle of the vane determines the amount of swirl imparted to the inflowing air and the vanes 54 may by positioned to provide either clockwise or counterclockwise swirl, i.e., co-swirl or counter-swirl relative to the swirl from swirler 32 depending upon application. (Vane angle is usually measured relative to a perpendicular at the midpoint.) As seen in FIG. 2, the annular passage 46 generally converges radially inwardly as the passage extends longitudinally from the inner end 50 to the outlet end 48.

The fuel film produced at the fuel discharge outlet is concentric to and disposed between the air outlet 42 of swirler 32 and the air outlet 48 of swirler 34 to subject the fuel film on one side to high velocity air from swirler 32 and on the other side to high velocity air from swirler 34. The high velocity swirling air on each side of the fuel film creates a shear layer which atomizes the fuel and produces a rapidly mixing, downstream flowing fuel-air mixture. The radial inflow swirler is believed to provide more airflow compared to similarly dimensioned axial swirlers and it contributes to reducing vane wakes and providing a more uniform fuel-air mixture with rapid mixing.

Figure 6:
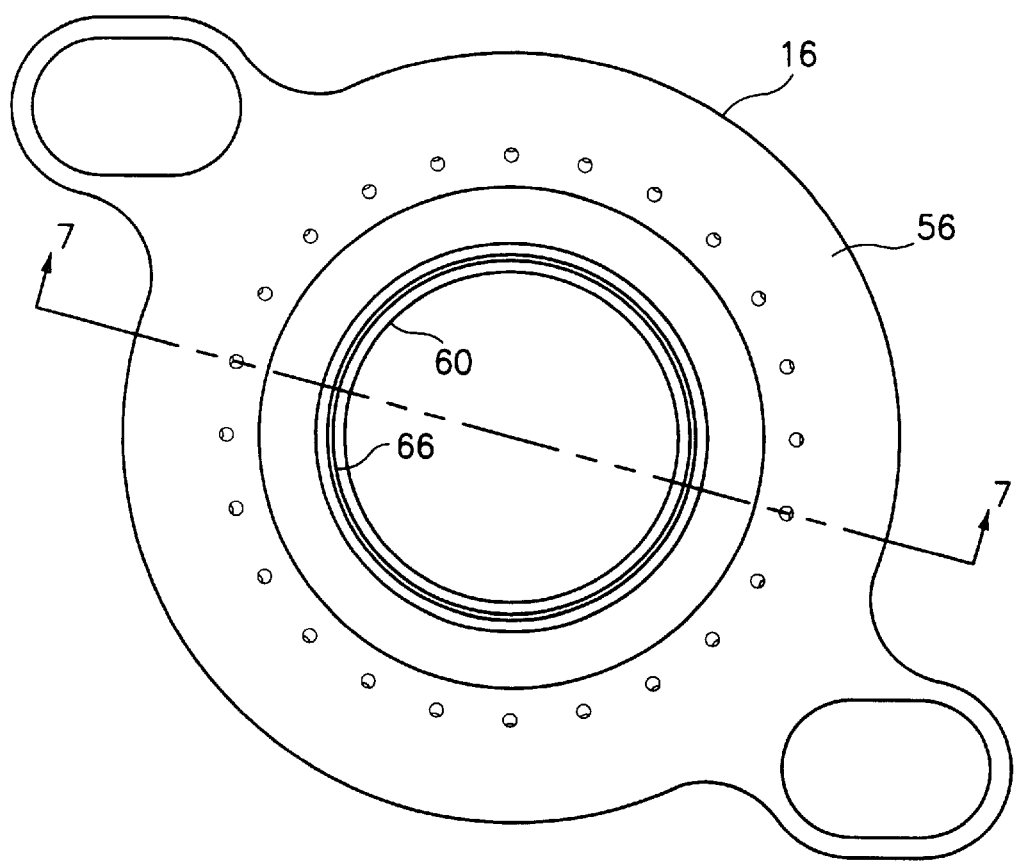
FIG. 6 is an enlarged elevation view of the guide of FIG. 2.
Figure 7:
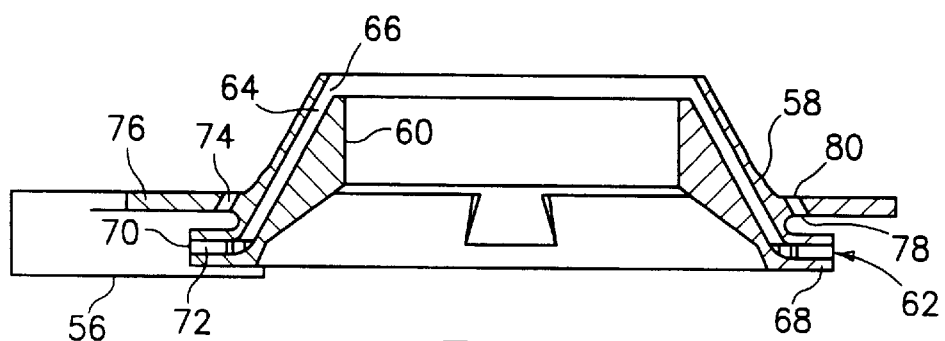
FIG. 7 is a sectional view seen on line 7—7 of FIG. 6.

The guide 16 of the present invention is used to mount the nozell 14 in dome 9 and properly align the nozzle relative to the combustor as more fully described in commonly assigned U.S. Pat. No. 5,463,864 to Butler et al. issued Nov. 7, 1995 entitled Fuel Nozzle Guide For A Gas Turbine Engine Combustor (which is incorporated herein by reference). Referring to FIGS. 6 and 7, the guide 16 has a generally annular base 56 with an outwardly extending frusto-conical hub section 58 forming a central mounting aperture 60 dimensioned for snug slip-fit mounting of the head 18 (FIG. 2). The centerline of the guide (not shown) is concurrent with the centerline 38 of head 18 when it is mounted within the guide 16.

The guide 16 includes a radial inflow swirler 62. The swirler 62 has a frusto-conical air passage 64 formed in the hub section 58 concentric to centerline 38 (when nozzle head 18 is mounted in the guide 16) with an annular outlet end 66 concentric about and adjacent to outlet 48 of swirler 34 (Fig.2). The inner end 68 of passage 64 is positioned in the annular base 56 and has a plurality of equi-spaced, circumferentially disposed air inlet ports 70. The ports 70 open radially outwardly for the radial inflow of air into the passage 64. Each port 70 has an adjoining swirl vane surface 72 disposed at a predetermined swirl angle to impart swirl to the inflowing air. The angle of the vane surface determines the amount of swirl imparted to the inflowing air and the vane surfaces 72 may by positioned to provide either clockwise or counterclockwise swirl, i.e., co-swirl or counter-swirl relative to the swirl from swirlers 32,34 depending upon application. As seen in FIG. 2, the frusto-conical passage 64 generally converges radially inwardly as the passage extends longitudinally from the inner end 68 to the outlet end 66 such that a progressively converging helical air pathway is followed by the swirled air.

The swirled air from outlet 66 is directed into the fuel-air mixture from the nozzle head 18 producing (above idle power) a fuel rich, more uniform fuel-air mixture with rapid mixing as the mixture moves downstream.

The guide 16 includes an additional air source to the fuel-air mixture in the form of a plurality of axial inflow air passages 74 in a flange portion 76 of base 56. Each passage 74 has an inlet end 78 and an outlet end 80 (FIG. 7) and is disposed generally parallel to passage 64, i.e., extending outwardly from the base and radially inwardly. As best seen in FIG. 6, the outlets 80 are disposed in a concentric array about the outlet 66 of swirler 62. It is believed that air from the outlets 80 purges the area about the nozzle and contributes to the mixing and flow of the fuel-air mixture. Alternately, the passages 74 can be disposed to provide some swirl to the discharged air so as provide an outer curtain or pattern which may tend to confine the rich fuel-air mixture central core downstream.

In the illustrated embodiment which depicts a combustor for a 20,000 lb. thrust engine, the vane angle for the swirler 32 is 70 degrees, the vane angle for swirler 34 is 47 degrees and the vane angle for swirler 62 is 22 degrees. This configuration provides a rapidly mixing, highly uniform downstream flowing fuel-air mixture into the combustion chamber 11 which contributes to a low NOx combustion process. Further, the dome height is 4.0" and the distance L to the first row of air inlets 17 is 3.1" (such that L/H=0.78). The array of inlets 17 are dimensioned to introduce into the combustion chamber approximately 21% of the airflow entering the combustor. The array of inlets 19 are dimensioned to introduce into the combustion chamber approximately 27% of the airflow entering the combustor. The nozzle/guide assembly 10 injects approximately 14–15% of the airflow. For a particular application, the precise size and location of the air inlets is to be determined by testing rather than calculation.

In a similar combustor (not shown) scaled for a larger 98,000 lb. thrust engine, the vane angle for the swirler 32 is 70 degrees, the vane angle for swirler 34 is 48 degrees and the vane angle for swirler 62 is 24 degrees. The dome height is 4.0" and the distance L to the first row of air inlets 17 is 4.2" (such that L/H=1.05). The array of inlets 17 are dimensioned to introduce into the combustion chamber approximately 23% of the airflow entering the combustor. The array of inlets 19 are dimensioned to introduce into the combustion chamber approximately 25% of the airflow entering the combustor. The nozzle/guide assembly 10 injects approximately 17–18% of the airflow.

Referring to FIG. 8 wherein identical numerals are utilized to identify like or similar parts, an alternate embodiment guide 86 is shown having a radial inflow swirler 88 instead of the air passages 74. Similar to swirler 62, the swirler 88 has an annular or frusto-conical air passage 90 formed in the hub section 58 concentric about the air passage 64 of swirler 62 with an annular outlet end 92 concentric about and adjacent to outlet 66 of swirler 62. The inner end 94 of passage 90 is positioned in the annular base 56 and has a plurality of equi-spaced, circumferentially disposed air inlet ports 96. The ports 96 open radially outwardly for the radial inflow of air into the passage 90. Each port 96 has an adjoining swirl vane surface 98 disposed at a predetermined swirl angle to impart swirl to the inflowing air. As previously described the vane angles may be selected as desired and the vane surfaces 72 may by positioned to provide either clockwise or counterclockwise swirl relative to the other swirlers depending upon application.

Referring to FIG. 9, the swirl orientation for the embodiment of FIG. 8 is shown whereby the swirl direction from swirlers 32,34 (in the nozzle) is counter to the swirl direction from swirlers 62,88. In this embodiment, the vane angles of swirlers 32,34 are unchanged while the vane angle of the swirler 88 is 10 degrees and the vane angle of the swirler 62 is 45 degrees. It is believed that the emanating fuel-air mixture pattern is tighter being confined by the swirled air 100 from the outer swirler 88 as diagramatically shown (not to scale) in FIG. 8 while the swirled air 102 (counter to the air from swirlers 32,24) contributes to rapidly mixing the fuel-air mixture to an improved uniform condition for combustion.

Referring back to FIG. 1, the nozzle/guide assembly 10 produces a highly mixed, uniform distribution, downstream flowing fuel-rich fuel-air mixture into the combustion chamber. The uniform distribution resulting from the improved mixing action from the swirlers eliminates the need for additional "smoke control" air inlets in the combustor walls between the dome 9 and the first array 15 of air inlets 17, i.e. the uniform distribution reduces the occurrance of fuel-rich pockets which cause smoke. By the elimination of such "smoke control" air inlets, the fuel-air spray (in above idle power operation) remains in a fuel-rich condition longer (i.e., range of $\phi$ for fuel-rich condition is 1.6–3.3) which limits the production of NOx. Furthermore, elimination of the "smoke control" air inlets results in more airflow being available to rapidly dilute and quench the fuel-air mixture for a shorter residence time at the high flame temperatures which produce Nox, i.e., a rapid mix process (due to a more uniform distribution and more available airflow) and lower residence time. A more uniform distribution is also advantageous for reducing temperature streaks at the discharge end of the combustor going to the turbine section of the engine. Overall, it is advantageous in controlling NOx to minimize the distance between the introduction of dilution and quenching air and the discharge end of the combustor without an unacceptable occurance of temperature streaks (i.e., and conversely maximizing the distance from the dome to the introduction of dilution and quenching air).

As will be appreciated from the foregoing, a new and improved combustor and method of operation has been disclosed which reduces Nox emission in a gas turbine engine without a detrimental increase in smoke. The combustor achieves enhanced mixing so as to substantially reduce fuel-rich pockets to thereby control smoke. A rapid mixing process is achieved at some distance downstream of the fuel injection mechanism and residence time at high temperature is reduced.

As will be apparent to persons skilled in the art, various modifications and adaptations of the structure above-described will become readily apparent without departure from the spirit and scope of the invention, the scope of which is defined in the appended claims.

What is claimed is:

1. A combustor for a gas turbine engine comprising:

first and second sidewall sections connected to a dome end wall to form an elongated combustion chamber having an upstream end and a downstream end;

said dome wall being disposed at the upstream end of the combustion chamber and having a predetermined dome height;

a fuel injector/air swirler assembly mounted in the dome wall for injecting a fuel air spray into the combustion chamber, said fuel injector/swirler assembly being configured to produce a fuel-rich highly mixed fuel-air spray pattern with uniform distribution;

side sidewalls containing a first and second array of air inlets configured for introducing airflow into the combustion chamber sufficient to cause rapid combustion and a rapidly resulting lean-fuel air mixture;

said first array of air inlets being disposed to direct air inflow into the fuel-air spray pattern in the combustion chamber and positioned a predetermined distance downstream from said dome wall, said predetermined distance being greater than 0.75 times said dome height; and said second array of air inlets being disposed to direct air inflow into the fuel-air spray pattern in the combustion chamber and positioned downstream from said first array;

said fuel injector/air swirler assembly comprises:

a fuel delivery passage having a discharge outlet for discharging fuel;

a first airflow swirler having a first outlet disposed to provide swirling air to discharging fuel, said first swirler being an axial inflow swirler configured to swirl air in a first angular direction;

a second airflow swirler having a second outlet disposed to provide swirling air to discharging fuel, said second swirler being a radial inflow swirler configured to swirl air in said first angular direction;

said first and second outlets being positioned to provide swirling air to fuel at said discharge outlet to produce a downstream-flowing fuel air mixture; and a third airflow swirler having a third outlet disposed to provide swirling air to said fuel air mixture, said third swirler being a radial inflow swirler configured to swirl air in said first angular direction.

2. The device of claim 1 comprising a fourth air flow swirler having a fourth outlet disposed to provide swirling air to said fuel air mixture, said fourth swirler being a radial inflow swirler with said fourth outlet disposed about said third outlet of said third swirler and configured to swirl air in said first angular direction.

3. The device of claim 1 comprising an array of air passages about said third outlet of said third swirler, said array of air passages configured to discharge air approximately parallel to said third airflow swirler.

4. A combustor for a gas turbine engine comprising:

first and second sidewall sections connected to a dome end wall to form an elongated combustion chamber having an upstream end and a downstream end;

said dome wall being disposed at the upstream end of the combustion chamber and having a predetermined dome height;

a fuel injector/air swirler assembly mounted in the dome wall to injecting a fuel air spray into the combustion chamber, said fuel injector/swirler assembly being configured to produce a fuel-rich highly mixed fuel-air spray pattern with uniform distribution;

side sidewalls containing a first and second array of air inlets configured for introducing airflow into the combustion chamber sufficient to cause rapid combustion and a rapidly resulting lean-fuel air mixture;

said first array of air inlets being disposed to direct air inflow into the fuel-air spray pattern in the combustion chamber and positioned a predetermined distance downstream from said dome wall, said predetermined distance being greater than 0.75 times said dome height; and said second array of inlets being disposed to direct air inflow into the fuel-air spray pattern in the combustion chamber and positioned downstream from said first array;

said fuel injector/air swirler assembly comprises:
  a fuel delivery passage having a discharge outlet for discharging fuel;
  a first airflow swirler having a first outlet disposed to provide swirling air to discharging fuel, said first swirler being an axial inflow swirler configured to swirl air in a first angular direction;
  a second airflow swirler having a second outlet disposed to provide swirling air to discharging fuel, said second swirler being a radial inflow swirler configured to swirl air in said first angular direction;
  said first and second outlets being positioned to provide swirling air to fuel at said discharge outlet to produce a downstream-flowing fuel air mixture;
  a third airflow swirler having a third outlet disposed to provide swirling air to said fuel air mixture, said third swirler being a radial inflow swirler configured to swirl air in a second angular direction opposite to said first angular direction; and
  a fourth airflow swirler having a fourth outlet disposed to provide swirling air to said fuel air mixture, said fourth swirler being a radial inflow swirler with said fourth outlet disposed about said third outlet of said third swirler and configured to swirl air in said second angular direction.

5. A combustor for a gas turbine engine comprising:

first and second sidewall sections connected to a dome end wall to form an elongated combustion chamber having an upstream end and a downstream end;

said dome wall being disposed at the upstream end of the combustion chamber and having a predetermined dome height;

a fuel injector/air swirler assembly mounted in the dome wall for injecting a fuel air spray into the combustion chamber, said fuel injector/swirler assembly being configured to produce a fuel-rich highly mixed fuel-air spray pattern with uniform distribution;

said sidewalls containing a first and second array of air inlets configured for introducing airflow into the combustion chamber sufficient to cause rapid combustion and a rapidly resulting lean-fuel air mixture;

said first array of air inlets being disposed to direct air inflow into the fuel-air spray pattern in the combustion chamber and positioned a predetermined distance downstream from said dome wall, said predetermined distance being greater than 0.75 times said dome height; and said second array of inlets being disposed to direct air inflow into the fuel-air spray pattern in the combustion chamber and positioned downstream from said first array;

said fuel injector/air swirler assembly comprises:
  a fuel delivery passage having a discharge outlet for discharging fuel;
  a first airflow swirler having a first outlet disposed to provide swirling air to discharging fuel, said first swirler being an axial inflow swirler configured to swirl air in a first angular direction;
  a second airflow swirler having a second outlet disposed to provide swirling air to discharging fuel, said second swirler being a radial inflow swirler configured to swirl air in said first angular direction;
  said first and second outlets being positioned to provide swirling air to fuel at said discharge outlet to produce a downstream-flowing fuel air mixture;
  a third airflow swirler having a third outlet disposed to provide swirling air to said fuel mixture, said third swirler being a radial inflow swirler configured to swirl air in a second angular direction opposite to said first angular direction; and
  a fourth airflow swirler having a fourth outlet disposed to provide swirling air to said fuel air mixture, said fourth swirler being a radial inflow swirler with said fourth outlet disposed about said third outlet of said third swirler and configured to swirl air in said first angular direction.

6. A combustor for a gas turbine engine comprising:

first and second sidewall sections connected to a dome end wall to form an elongated combustion chamber having an upstream end and a downstream end;

said dome wall being disposed at the upstream end of the combustion chamber and having a predetermined dome height;

a fuel injector/air swirler assembly mounted in the dome wall for injecting a fuel air spray into the combustion chamber, said fuel injector/swirler assembly being configured to produce a fuel-rich highly mixed fuel-air spray pattern with uniform distribution;

said sidewalls containing a first and second array of air inlets configured for introducing airflow into the combustion chamber sufficient to cause rapid combustion and a rapidly resulting lean-fuel air mixture;

said first array of air inlets being disposed to direct air inflow into the fuel-air spray pattern in the combustion chamber and positioned a predetermined distance downstream from said dome wall, said predetermined distance being greater than 0.75 times said dome height; and said second array of air inlets being disposed to direct air inflow into the fuel-air spray pattern in the combustion chamber and positioned downstream from said first array;

said fuel injector/air swirler assembly comprises:

a fuel delivery passage having a discharge outlet for discharging fuel;

a first airflow swirler having a first outlet disposed to provide swirling air to discharging fuel, said first swirler being an axial inflow swirler configured to swirl air in a first angular direction;

a second airflow swirler having a second outlet disposed to provide swirling air to discharging fuel, said second swirler being a radial inflow swirler configured to swirl air in said first angular direction;

said first and second outlets being positioned to provide swirling air to fuel at said discharge outlet to produce a downstream-flowing fuel air mixture;

a third airflow swirler having a third outlet disposed to provide swirling air to said fuel air mixture, said third swirler being a radial inflow swirler configured to swirl air in a second angular direction opposite to said first angular direction; and an array of air passages about said third outlet of said third swirler, said array of air passages configured to discharge air approximately parallel to said third airflow swirler.

* * * * *